(12) United States Patent
Seetharaman et al.

(10) Patent No.: US 9,813,358 B2
(45) Date of Patent: Nov. 7, 2017

(54) SYSTEMS, METHODS, AND APPARATUS FOR ARP MEDIATION

(71) Applicant: Infinera Corporation, Annapolis Junction, MD (US)

(72) Inventors: Srini Seetharaman, Sunnyvale, CA (US); Balaji Balasubramanian, Sunnyvale, CA (US); Sri Mohana Satya Srinivas Singamsetty, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/794,382

(22) Filed: Jul. 8, 2015

(65) Prior Publication Data

US 2017/0012933 A1    Jan. 12, 2017

(51) Int. Cl.
| | |
|---|---|
| *H04L 12/937* | (2013.01) |
| *H04L 29/12* | (2006.01) |
| *H04L 12/26* | (2006.01) |
| *H04L 12/28* | (2006.01) |
| *H04L 12/24* | (2006.01) |

(52) U.S. Cl.
CPC ........... *H04L 49/254* (2013.01); *H04L 12/28* (2013.01); *H04L 41/00* (2013.01); *H04L 43/50* (2013.01); *H04L 61/103* (2013.01); *H04L 61/2015* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 8,359,376 | B1 * | 1/2013 | Yalagandula | H04L 61/103 709/221 |
| 2013/0294451 | A1 * | 11/2013 | Li | H04L 45/66 370/392 |
| 2015/0117216 | A1 * | 4/2015 | Anand | H04L 47/125 370/236 |
| 2015/0326524 | A1 * | 11/2015 | Tankala | H04L 61/103 709/245 |
| 2016/0197876 | A1 * | 7/2016 | Bui | H04L 61/103 370/392 |

FOREIGN PATENT DOCUMENTS

IN    WO 2014115157 A1 *    7/2014    ........... H04L 61/103

* cited by examiner

*Primary Examiner* — Rina Pancholi
(74) *Attorney, Agent, or Firm* — David L. Soltz

(57) ABSTRACT

An exemplary network controller may be configured to perform ARP mediation through passively learning MAC addresses on client sides and keeping track of IP/MAC/Attachment point associations, hijacking ARP requests received by the core nodes through a packet_in operation or a redirection to other agents, injecting proxy ARP replies that provide target MAC information without the actual target being involved, and possibly programming the network nodes with the static ARP responding rule for a specified duration.

11 Claims, 6 Drawing Sheets

SYSTEMS, METHODS, AND APPARATUS FOR ARP MEDIATION

FIELD OF DISCLOSURE

This disclosure relates generally to telecommunications networks and more specifically, but not exclusively, to address resolution in telecommunications networks.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g. virtual private networks requirements) has inadvertently cause modern networks to become labyrinth-like and difficult to manage. As a result, vendors and third-party operators continually struggle to customize, optimize, and improve the performance of the interwoven web of network nodes.

For example, MPLS networks have evolved over the last 10-15 years to become critically important for ISPs. They provide two key services: traffic engineering in IP networks and L2 or L3 enterprise VPNs. However as carriers deploy MPLS networks, they find that (a) even though the MPLS data plane was meant to be simple, vendors end up supporting MPLS as an additional feature on complex, energy hogging, expensive core routers; and (b) the IP/MPLS control plane has become exceedingly complex with a wide variety of protocols tightly intertwined with the associated data-plane mechanisms.

In recent years, Software defined networking (SDN) is an emerging network technology that addresses customization and optimization concerns within convoluted networks. SDN simplifies modern networks by decoupling the data-forwarding capability (e.g. a data plane) from routing, resource, and other management functionality (e.g. a control plane) previously performed in the network nodes. Network nodes that support SDN (e.g., that are SDN compliant) may be configured to implement the data plane functions, while the control plane functions may be provided by a SDN controller. Open application programming interface (API) services, such as the OpenFlow protocol, may manage the interactions between the data plane and control plane and allow for the implementation of non-vendor specific combinations of networking nodes and SDN controllers within a network. As a result, SDN in conjunction with an Open API (e.g., OpenFlow) service may provide numerous benefits to modern networks that include increased network virtualization, flexible control and utilization of the network, and customization of networks for scenarios with specific requirements.

A new approach to MPLS that uses the standard MPLS data-plane with a simpler and extensible control-plane based on SDN principles and OpenFlow API for signaling the control plane decisions to the data plane. There are significant advantages in using this approach. The control-plane is greatly simplified and is de-coupled from a simple data-plane. And we can still provide all the services that MPLS networks provide today. More importantly we can do much more: we can globally optimize the services; make them more dynamic; or create new services by simply programming networking applications on top of the SDN Controller. However, problems still exist when using SDN with a MPLS core.

Namely, before each host communicates with another host in the Layer 2 domain, it uses Address Resolution Protocol (ARP) to resolve the MAC address of target host by broadcasting ARP request datagrams. Once ARP reply is received with the target MAC address, this resolved MAC address is kept in a local cache. This cached value is expired on a periodic basis to allow the target host to move or for the network to dynamically change the IP address allocation using DHCP. This makes it essential to frequently broadcast ARP requests at the L2. When there are 100s of 1000s of hosts, this amounts to large amounts of overhead traffic in the network and increased setup time for communication between hosts. In addition, the ARP resolution could also span over the high-latency MPLS core which exacerbates the issue. Thus, a new ARP mediation process is needed.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for address resolution in a software defined network may include: receiving an address resolution protocol request from a first client device at a first core node for an media access control address of a second client device; sending, by the first core node, a notification of the address resolution protocol request to a controller; determining, by the controller, if the second client device media access control address is stored in the controller; and sending, by the controller, an address resolution protocol reply to the first client device including the second client device media access control address when the controller determines the second client device media access control address is stored in the controller.

In another aspect, a core node includes at least one transceiver configured to receive an address resolution protocol request from a first client device for a media access control address of a second client device; send a notification of the address resolution protocol request to a controller; and receive an address resolution protocol reply including the second client device media access control address from the controller.

In still another aspect, a controller includes at least one transceiver configured to: receive a notification of an ARP request from a first core node, the ARP request being initially received from a first client node at the first core node for a second client node; determine if the second client node MAC address is known; and send an ARP reply to the first client node with the second client node MAC address when the controller determines the second client node address is known.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
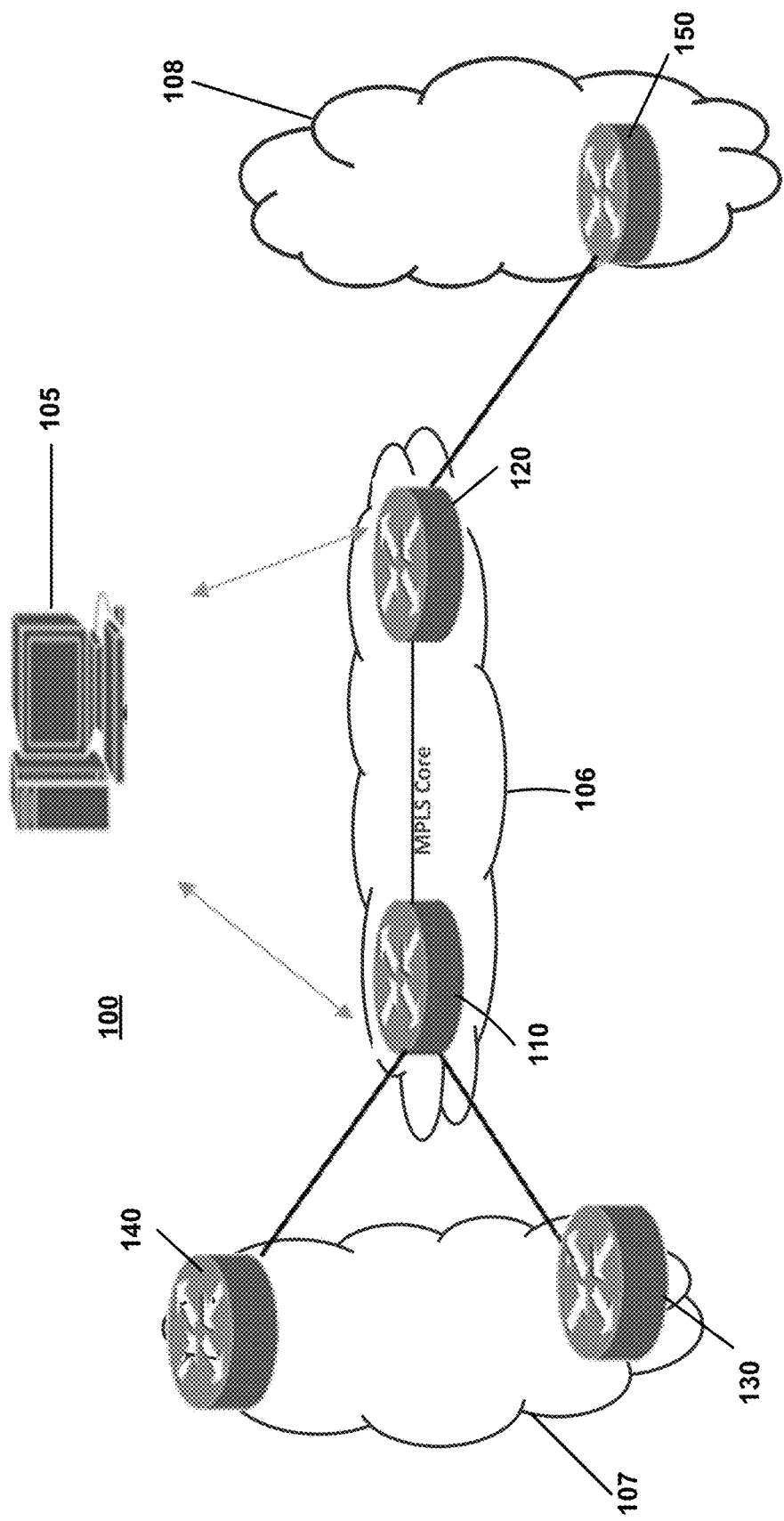
FIG. 1 illustrates an exemplary network diagram in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems.

FIG. 1 illustrates an exemplary network diagram in accordance with some examples of the disclosure. As shown in FIG. 1, a telecommunications network 100 may include a controller 105, a core network 106, a first client network 107, and a second client network 108. The core network 106 may include a plurality of network nodes, such as a first core node 110 and a second core node 120 with both communicatively coupled to the controller 105. The first client network 107 may include a first client node 130 (first client device) and a second client node 140 (second client device) communicatively coupled to the core network 106, such as through a connection to the first core node 110. The second client network 108 may include a third client node 150 communicatively coupled to the core network 106, such as through a connection to the second core node 120. While the core network 106 and the first client network 107 are shown with two nodes and the second client network 108 is shown with one node, it should be understood that more nodes (or less) may be present in each network. The plurality of nodes 110-150 may be network devices, such as flow programmable switches, routers, or similar devices. While only one controller 105 is shown, it should be understood that more than one controller may be included and these multiple controllers may be co-located or located is separate geographic locations. These multiple controllers may communicate with each other and, for example, they may co-manage the network resources, such as one controller may manage the network node close to the source client node and a different controller may manage the network node close to the target client node. In this case, the ARP information is shared appropriately between the two controllers.

Each of the core network nodes 110 and 120 may be configured to implement data plane functions, such as the data-forwarding capability, while the controller 105 may be configured to implement the control plane functions, such as routing, resource, and other management functionality. In addition, functions previously performed by the core nodes 110 and 120 may be performed by the controller 105. For example, the controller 105 may be configured to provide a service mediator function that may actively perform ARP mediation for both the first client network 107 and the second client network 108 through three primitives used in a combined manner: passively learning Media Access Control (MAC) addresses in the first client network 107 and the second client network 108 and keeping track of Internet Protocol (IP)/MAC/Attachment point associations; hijacking ARP requests received by the first core node 110 and the second core node 120 through a packet_in operation or a redirection to other agents in the controller 105; and injecting proxy ARP replies that provide target MAC information without the actual target being involved. The communication between a node, such as the core node 110, and the controller 105 may use packet_out and packet_in messages. For example, when the core node 110 sends a message to the controller 105, the message is sent as a packet_in message. When the controller wishes that the core node 110 send out a custom packet or datagram, that request is sent as a packet_out message, which includes the embedded data and output interface information. Examples of additional functions performed by the core nodes 110 and 120 will be described in more detail with reference to FIG. 2 and subsequent figures.

Figure 2:
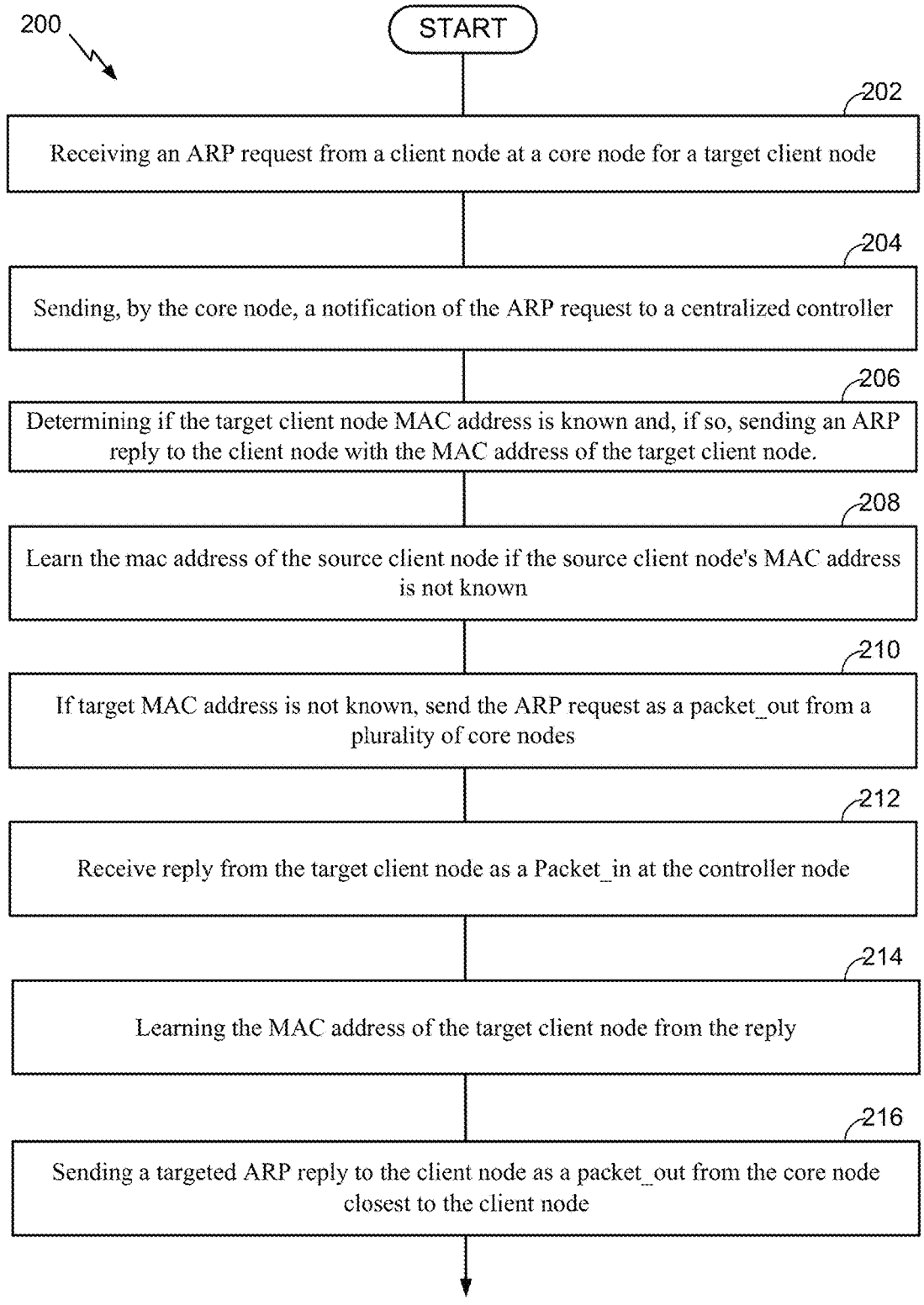
FIG. 2 illustrates an exemplary partial process flow for data communication in accordance with some examples of the disclosure.

FIG. 2 illustrates an exemplary partial process flow for data communication in accordance with some examples of the disclosure. As shown in FIG. 2, the partial process 200 begins in block 202 with reception of an ARP request from a client node (such as the first client node 130) at a core node (such as the first core node 110) for a target client node (such as the third client node 150). In block 204, the core node sends a notification of the ARP request to a centralized controller (such as the controller 105). In block 206, the centralized controller begins processing the request by determining if the target client node MAC address is known and, if so, the controller will send an unicast ARP reply to the client node with the MAC address of the target client node. The unicast ARP reply may be sent as a packet_out directly from a port at the core node. In block 208, learn the mac address of the source client node if the source client node's MAC address is not known. In block 210, if the target MAC address is not known, send (flood) the ARP request as a packet_out from a plurality of core nodes (i.e., leaf nodes of the core network). Flooding the plurality of core nodes may be done without broadcasting the ARP request on a core node to core node by, for example, a controller push that does not traverse the data plane. In block 212, receive reply from the target client node as a Packet_in at the controller node. In block 214, the controller learns the MAC address of the target client node from the reply. In block 216, the partial process concludes with the controller sending a targeted ARP reply to the client node as a packet_out from the core node closest to the client node. By this process 200, the system avoids ARP packets traversing the core network that may lead to network congestion. The process 200 may also include periodically aging the learned MAC addresses since the IP association to a client node may change over time.

The process 200 described with reference to FIG. 2 may be modified to use an ARP responder or agent redirection. In one version, the controller may be configured to statically program a rule (in one of the plurality of core nodes or a supplementary agent) that carries an IP and MAC combination for every learned client node and may be specifically designed to create an ARP reply to the requesting client node. In another version, the controller may be configured to learn an IP and MAC combination periodically thus allowing a comprehensive copy of IP and MAC associations at the controller from Dynamic Host Configuration Protocol (DHCP) replies, from other data packets, or proactive querying on a periodic basis. In another version, the controller may be configured to send gratuitous ARP messages so that proactively populate the client nodes' ARP cache for the most popular targets. For example, a controller may periodically disseminate gratuitous ARP requests/replies that includes the IP and MAC address binding of each known hosts. This may be done to update the target MAC address cache of individual hosts to ensure that the cache entries for a target host never expire. This has the potential upside of reducing the communication setup time and unnecessary packet_in being sent to the controller. A controller may also choose to do this gratuitous ARP request/reply for only a few popular target hosts. In any version described above, the controller may be configured to support state distribution systems (such as a distributed key-value store like redis) that have support for replication and clustering allowing the controller to keep the state in the controller and not in the core nodes themselves.

Figure 3A:
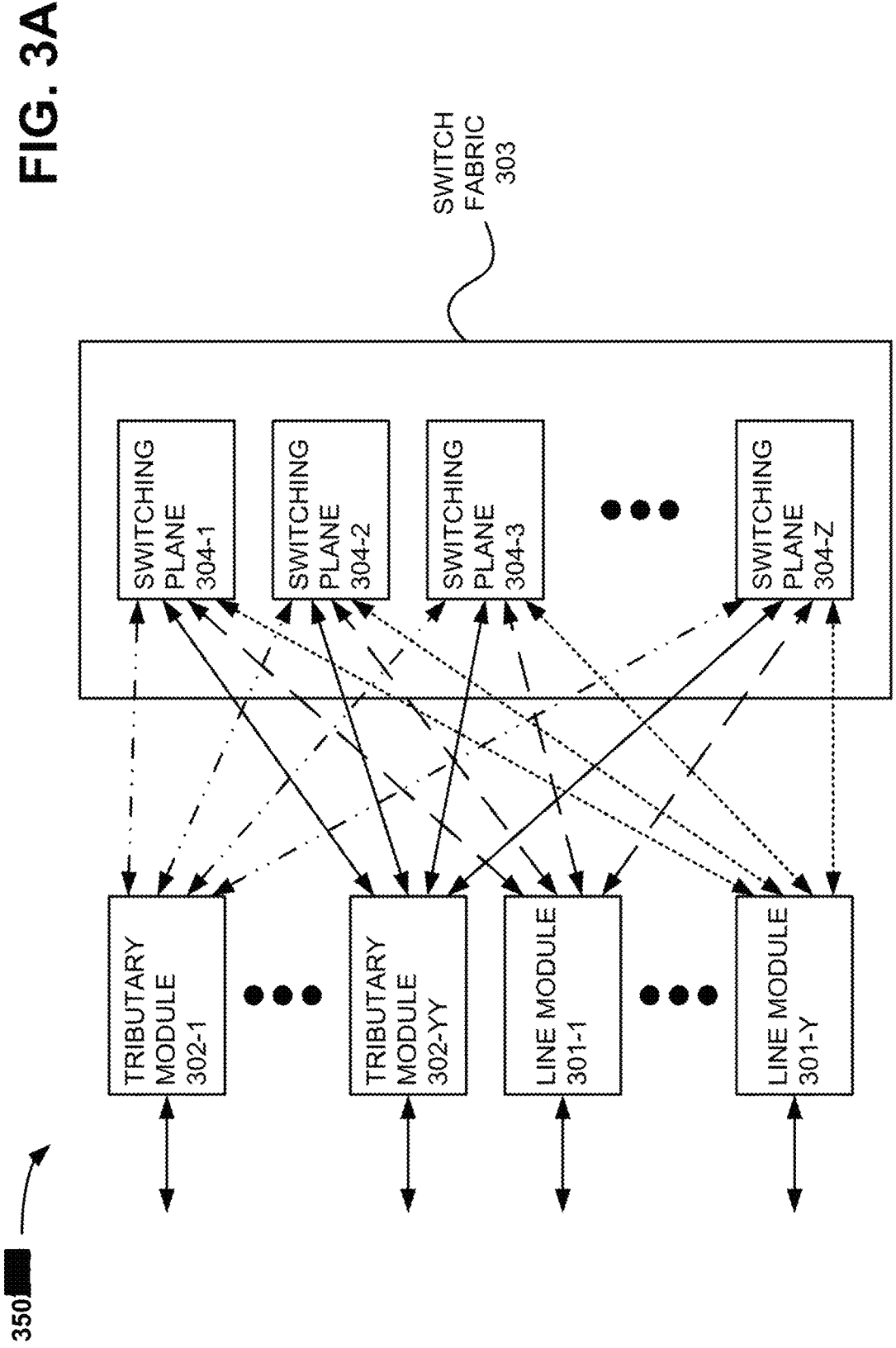
FIG. 3A illustrates example components of a network device in accordance with some examples of the disclosure.

FIG. 3A is a diagram of example components of a network node 350 (for example, core nodes 110 and 120). As shown in FIG. 3A, the network node 350 may include line modules 301-1, . . . , 301-Y (referred to collectively as "line modules 301," and generally as "line module 301") (where Y.gtoreq.1) and tributary modules 302-1, . . . , 302-YY (referred to collectively as "tributary modules 302," and generally as "tributary module 302") (where YY.gtoreq.1) connected to a switch fabric 303. As shown in FIG. 3A, switch fabric 303 may include switching planes 304-1, 304-2, . . . 304-Z (referred to collectively as "switching planes 304," and generally as "switching plane 304") (where Z.gtoreq.1).

Line module 301 may include hardware components, or a combination of hardware and software components, that may provide network interface operations. Line module 301 may receive a multi-wavelength optical signal and/or transmit a multi-wavelength optical signal (or similar signals such as Ethernet traffic). A multi-wavelength optical signal may include a number of optical signals of different optical wavelengths. In some implementations, line module 301 may perform retiming, reshaping, regeneration, time division multiplexing, and/or recoding services for each optical wavelength. Line module 301, associated with an ingress node, may also multiplex multiple signals into a super signal for transmission to one or more other core nodes.

Tributary module 302 may include hardware components, or a combination of hardware and software components, that may support flexible adding-dropping of multiple services, such as SONET/SDH services, gigabit Ethernet (Gbe) services, optical transport network (OTN) services, and/or fiber channel (FC) services. For example, tributary module 302 may include an optical interface device, such as a fiber optics module, a small-form pluggable (SFP) module, a tributary interface module (TIM), and/or some other type of optical interface device.

Switch fabric 303 may include hardware components, or a combination of hardware and software components, that may provide switching functions to transfer data between line modules 301 and/or tributary modules 302. In some implementations, switch fabric 303 may provide fully non-blocking transfer of data. Each switching plane 304 may be programmed to transfer data from a particular input to a particular output.

As shown in FIG. 3A, each of line modules 301 and tributary modules 302 may connect to each of switching planes 304. The connections between line modules 301/tributary modules 302 and switching planes 304 may be bidirectional. While a single connection is shown between a particular line module 301/tributary module 302 and a particular switching plane 304, the connection may include a pair of unidirectional connections (i.e., one in each direction).

While FIG. 3A shows a particular quantity and arrangement of components, network node 350 may include additional components, fewer components, different components, or differently arranged components than those illustrated in FIG. 3A. Also, it may be possible for one of the components of network node 350 to perform a function that is described as being performed by another one of the components.

Figure 3B:
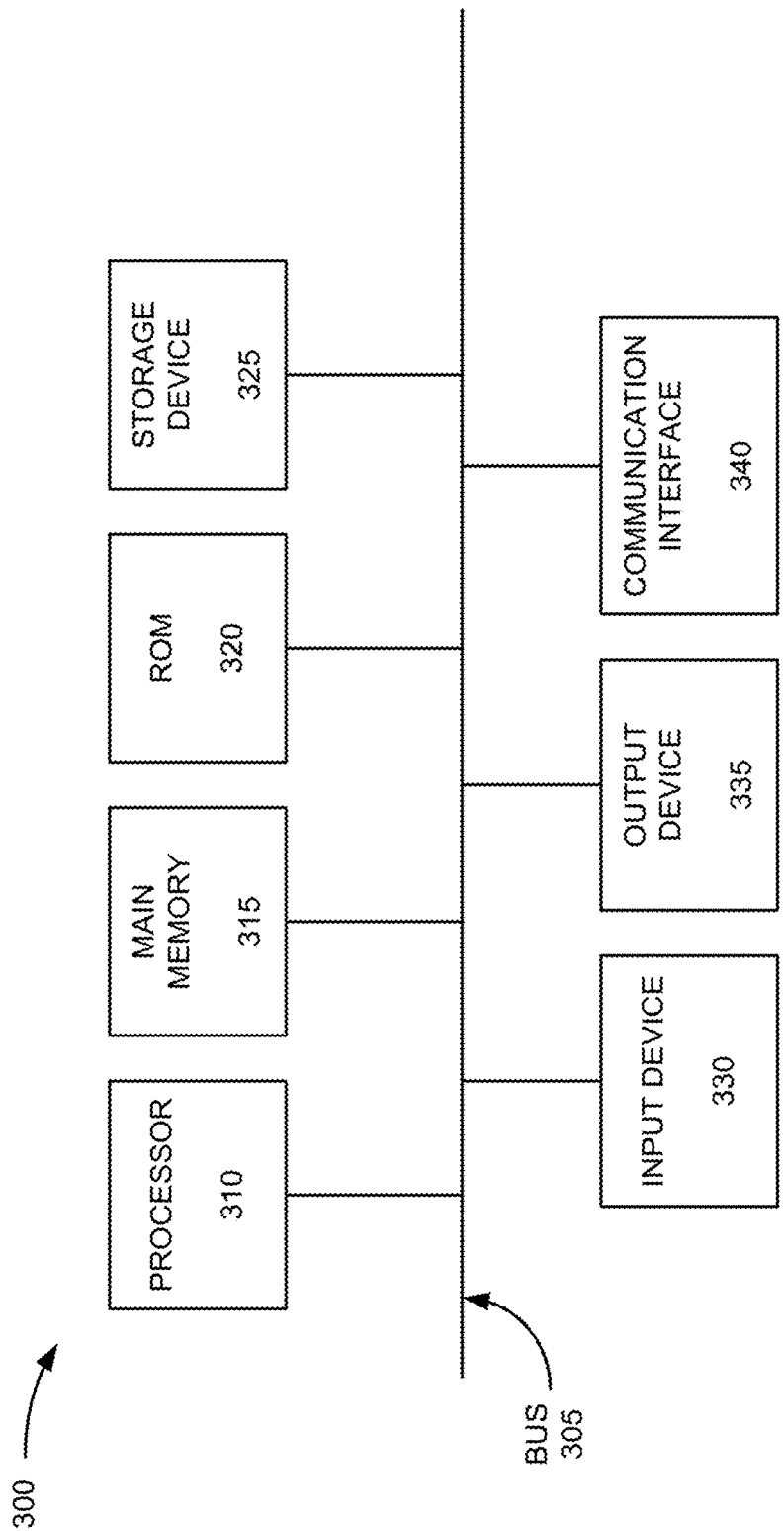
FIG. 3B illustrates example components of a device in accordance with some examples of the disclosure.

FIG. 3B illustrates example components of a device 300 that may be used within the telecommunications network 100 of FIG. 1. Device 300 may correspond to client device (such as the first client node 130, the second client node 140, the third client node 150, or the controller 105. Each device 300 may include one or more devices 300 and/or one or more components of device 300.

As shown in FIG. 3B, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes described above. Alternatively, hardwired circuitry may be used in place of or in combination with software instructions to implement processes described herein. Thus, implementations described herein are not limited to any specific combination of hardware circuitry and software. In some implementations, device 300 may include additional components, fewer components, different components, or differently arranged components.

Figure 4:
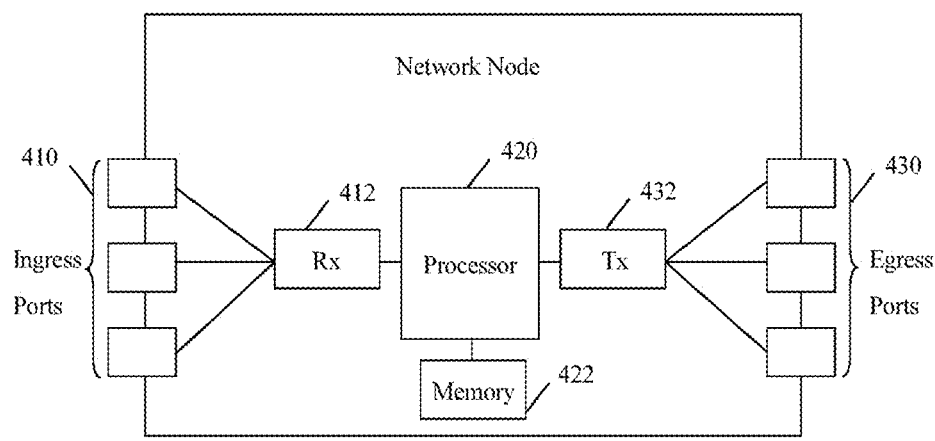
FIG. 4 is a diagram of an exemplary a network node device in accordance with some examples of the disclosure.

FIG. 4 illustrates an embodiment of a network unit or node 400, which may be any device configured to transport data through a network. For instance, the network node 400 may correspond to the core nodes 110 and 120 or any other node. The network node 400 may comprise one or more ingress ports 410 coupled to a receiver 412 (Rx), which may be configured for receiving packets or frames, objects, options, and/or type length values (TLVs) from other network components. The network node 400 may comprise a logic unit or processor 420 coupled to the receiver 412 and configured to process the packets or otherwise determine which network components to send the packets. The processor 420 may be implemented using hardware, or a combination of hardware and software.

The network node 400 may further comprise a memory 422, which may be a memory configured to store a flow table, or a cache memory configured to store a cached flow table. The network node 400 may also comprise one or more egress ports 430 coupled to a transmitter 432 (Tx), which may be configured for transmitting packets or frames, objects, options, and/or TLVs to other network components. Note that, in practice, there may be bidirectional traffic processed by the network node 400, thus some ports may both receive and transmit packets. In this sense, the ingress ports 410 and the egress ports 430 may be co-located or may be considered different functionalities of the same ports that are coupled to transceivers (Rx/Tx). The processor 420, the memory 422, the receiver 412, and the transmitter 432 may also be configured to implement or support any of the schemes and methods described above, such as the process 200.

It is understood that by programming and/or loading executable instructions onto the network node 400, at least one of the processor 420 and the memory 422 are changed, transforming the network node 400 in part into a particular machine or apparatus (e.g. a SDN switch having the functionality taught by the present disclosure). The executable instructions may be stored on the memory 422 and loaded into the processor 420 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Figure 5:
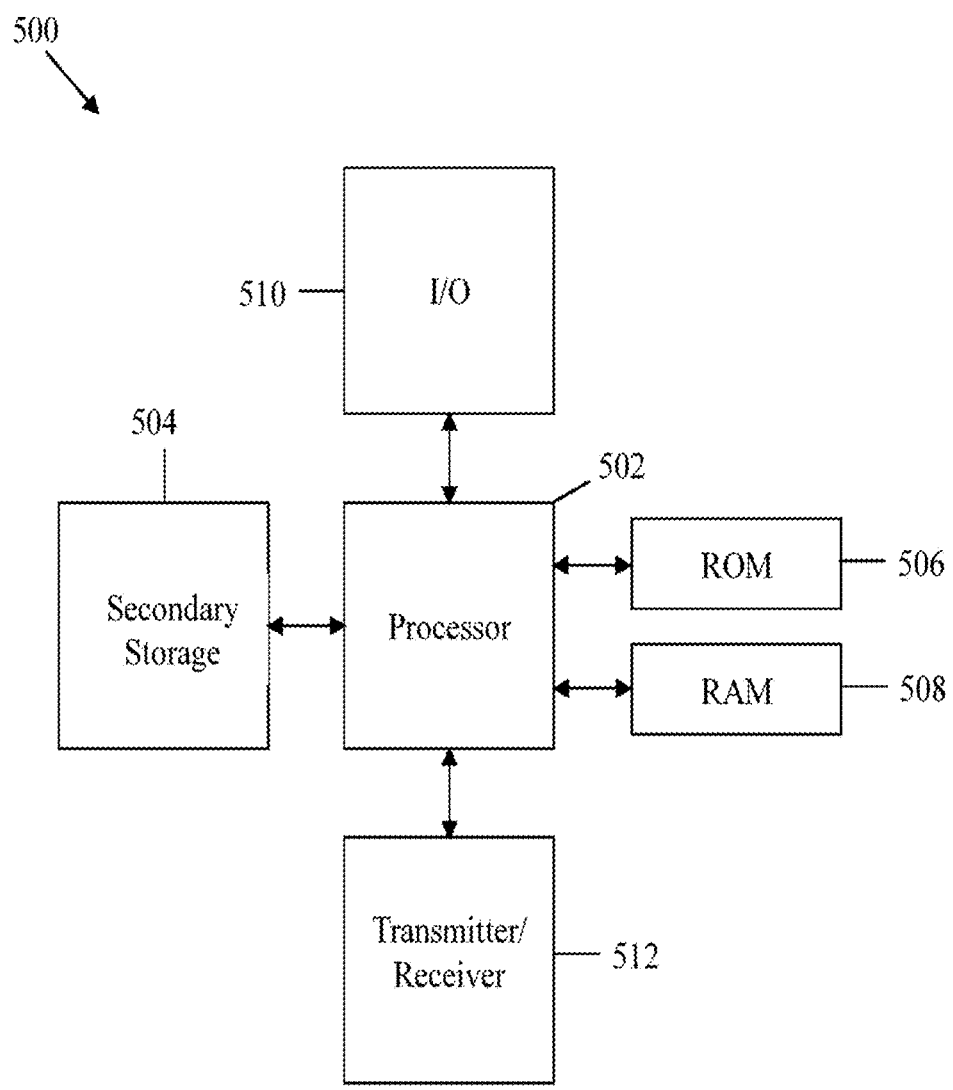
FIG. 5 is a diagram of an exemplary computer system device in accordance with some examples of the disclosure.

The system and schemes described above may be implemented on a network component or computer system, such as a computer or network component with sufficient processing power, memory resources, and network throughput capability to handle the necessary workload placed upon it. FIG. 5 illustrates an embodiment of a computer system 500 suitable for implementing one or more embodiments of the systems and methods disclosed herein, such as the network nodes 180 and 190, or the controller 105.

The computer system 500 includes a processor 502 that is in communication with memory devices including secondary storage 504, read only memory (ROM) 506, random access memory (RAM) 508, input/output (I/O) devices 510, and transmitter/receiver 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), ASICs, and/or digital signal processors (DSPs). The processor 502 may be configured to implement any of the schemes described herein, including the protocol 300. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 (sometimes referred to as a transceiver) may serve as an output and/or input device of the computer system 500. For example, if the transmitter/receiver 512 is acting as a transmitter, it may transmit data out of the computer system 500. If the transmitter/receiver 512 is acting as a receiver, it may receive data into the computer system 500. Further, the transmitter/receiver 512 may include one or more optical transmitters, one or more optical receivers, one or more electrical transmitters, and/or one or more electrical receivers. The transmitter/receiver 512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 512 may enable the processor 502 to communicate with an Internet or one or more intranets. The I/O devices 510 may be optional or may be detachable from the rest of the computer system 500. The I/O devices 510 may include a video monitor, liquid crystal display (LCD), touch screen display, or other type of display. The I/O devices 510 may also include one or more keyboards, mice, or track balls, or other well-known input devices.

Similar to the network node 400, it is understood that by programming and/or loading executable instructions onto the computer system 500, at least one of the processor 502, the secondary storage 504, the RAM 508, and the ROM 506 are changed, transforming the computer system 500 in part into a particular machine or apparatus (e.g. a controller 105 or client devices 180 and 190). The executable instructions may be stored on the secondary storage 504, the ROM 506, and/or the RAM 508 and loaded into the processor 502 for execution.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for address resolution in a software defined network, the method comprising:
   receiving an address resolution protocol request from a first client device at a first core node for a media access control address of a second client device;
   sending, by the first core node, a notification of the address resolution protocol request to a controller;
   determining, by the controller, if the second client device media access control address is stored in the controller;
   sending, by the controller, an address resolution protocol reply to the first client device including the second client device media access control address when the controller determines the second client device media access control address is stored in the controller;
   learning the first client device media access control address when the second client device media access control address is not stored in the controller; and
   sending the address resolution protocol request to a plurality of nodes after learning the first client device media access control address, such that the address resolution protocol request does not traverse a data plane of the software defined network.

2. The method for address resolution in a software defined network of claim 1, further comprising a database of media access control addresses stored in the controller or across a plurality of distributed controller instances, wherein the database is periodically updated by adding new media access control addresses as the new media access control addresses are learned and removing existing media access control addresses that are no longer valid.

3. The method for address resolution in a software defined network of claim 2, wherein the address resolution protocol request is sent as a packet_out from the first core node to the plurality of nodes and the plurality of nodes includes the second client device.

4. The method for address resolution in a software defined network of claim 2, further comprising receiving a reply from the second client device in response to sending the address resolution protocol request to the plurality of nodes.

5. The method for address resolution in a software defined network of claim 4, further comprising learning the second client device media access control address from the reply.

6. The method for address resolution in a software defined network of claim 5, further comprising send an unsolicited address resolution protocol reply to the plurality of nodes, the unsolicited address resolution protocol reply having media control access addresses from the database of media access control addresses stored in the controller.

7. The method for address resolution in a software defined network of claim 5, further comprising sending the address resolution protocol reply to the first client device.

8. The method for address resolution in a software defined network of claim 7, wherein the address resolution protocol reply is sent to the first client device as a packet_out from a core node closest to the first client device.

9. The method for address resolution in a software defined network of claim 7, wherein the controller is configured to statically program a rule in the first core node that carries an internet protocol and media access control combination for every learned media access control address and the first core node is configured to send the address resolution protocol reply to the first client device with the learned media access control address of the second client device.

10. The method for address resolution in a software defined network of claim 7, wherein the controller is configured to learn an internet protocol and media access control combination periodically and store internet protocol and media access control associations at the controller that are learned from one of a Dynamic Host Configuration Protocol reply, a data packet, or by proactive querying on a periodic basis.

11. The method for address resolution in a software defined network of claim 7, wherein the controller is configured to send an address resolution protocol message that proactively populates a first client device address resolution protocol cache with internet protocol and media access control associations of popular targets.

\* \* \* \* \*